Aug. 1, 1933.  T. R. REGENHARDT ET AL  1,920,319
SUBGRADING MACHINE
Filed May 14, 1931  6 Sheets-Sheet 1
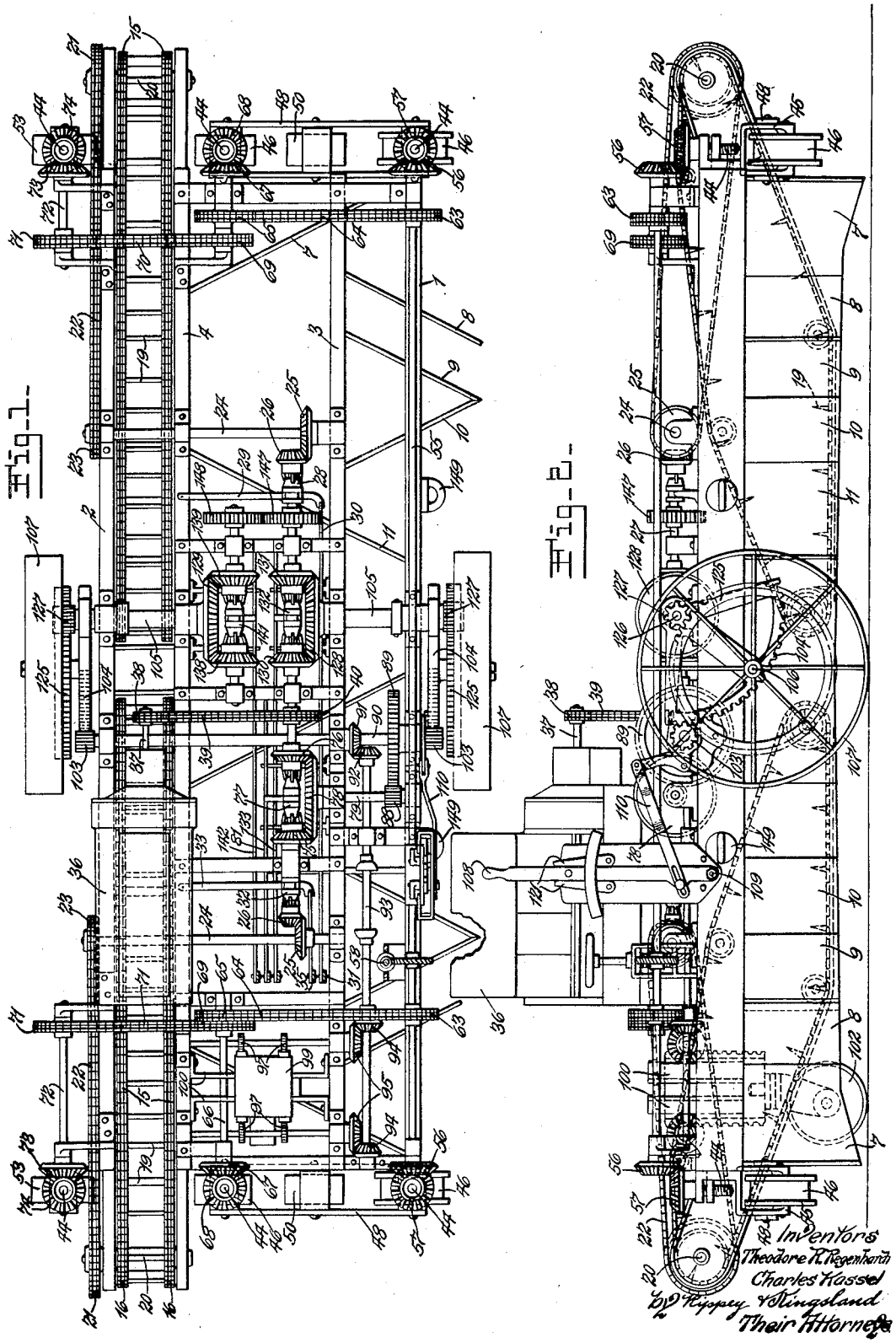

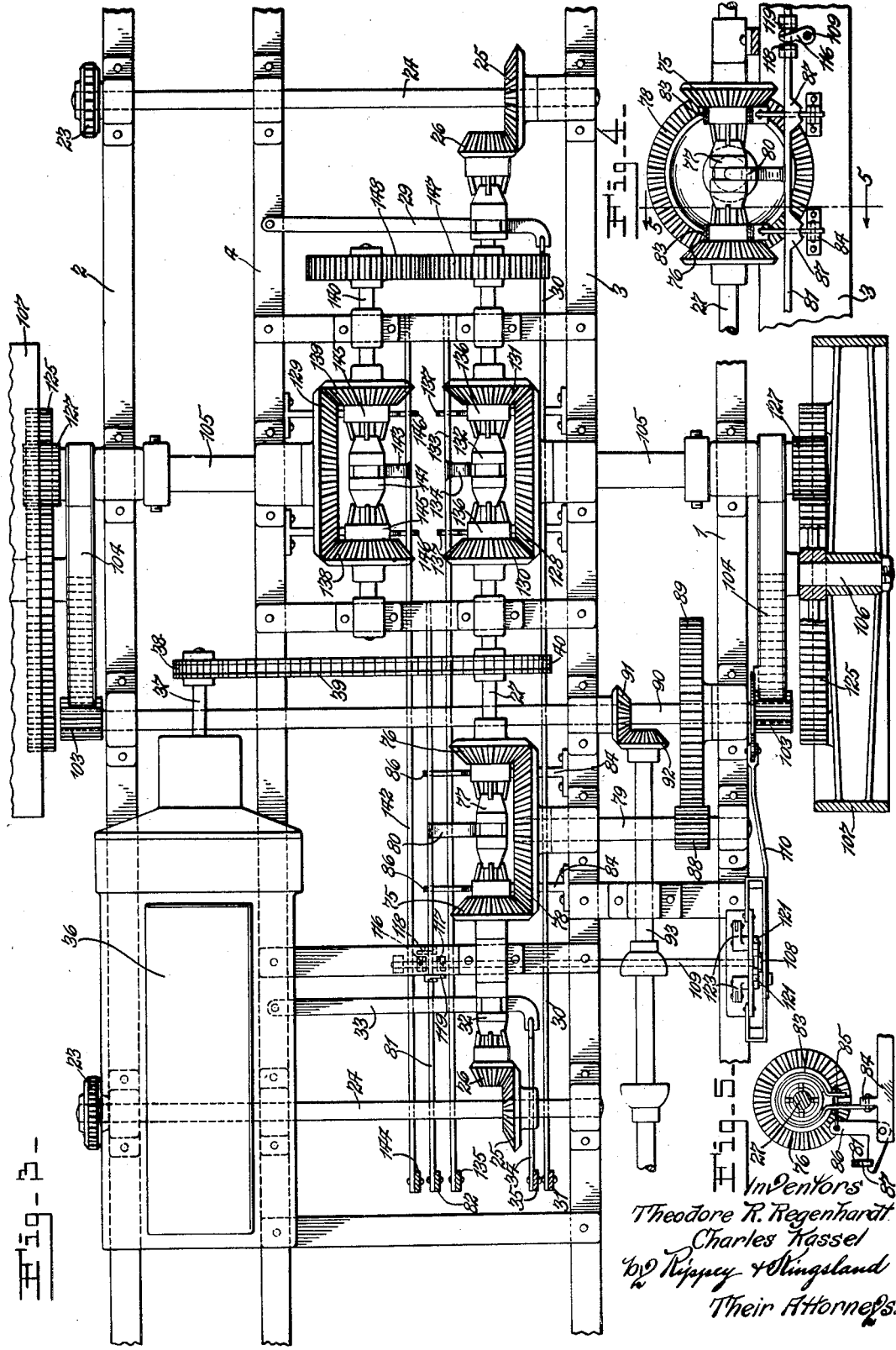

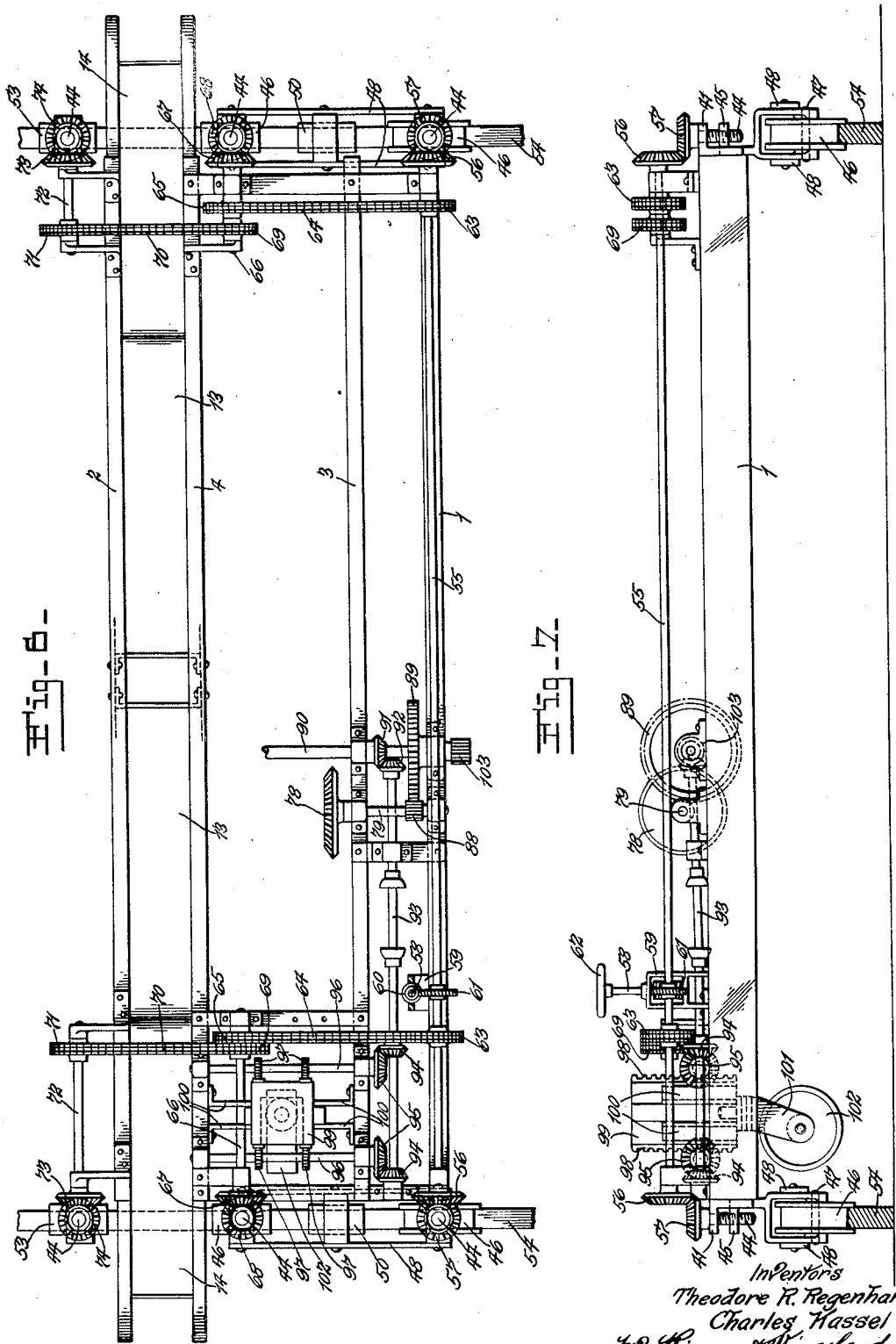

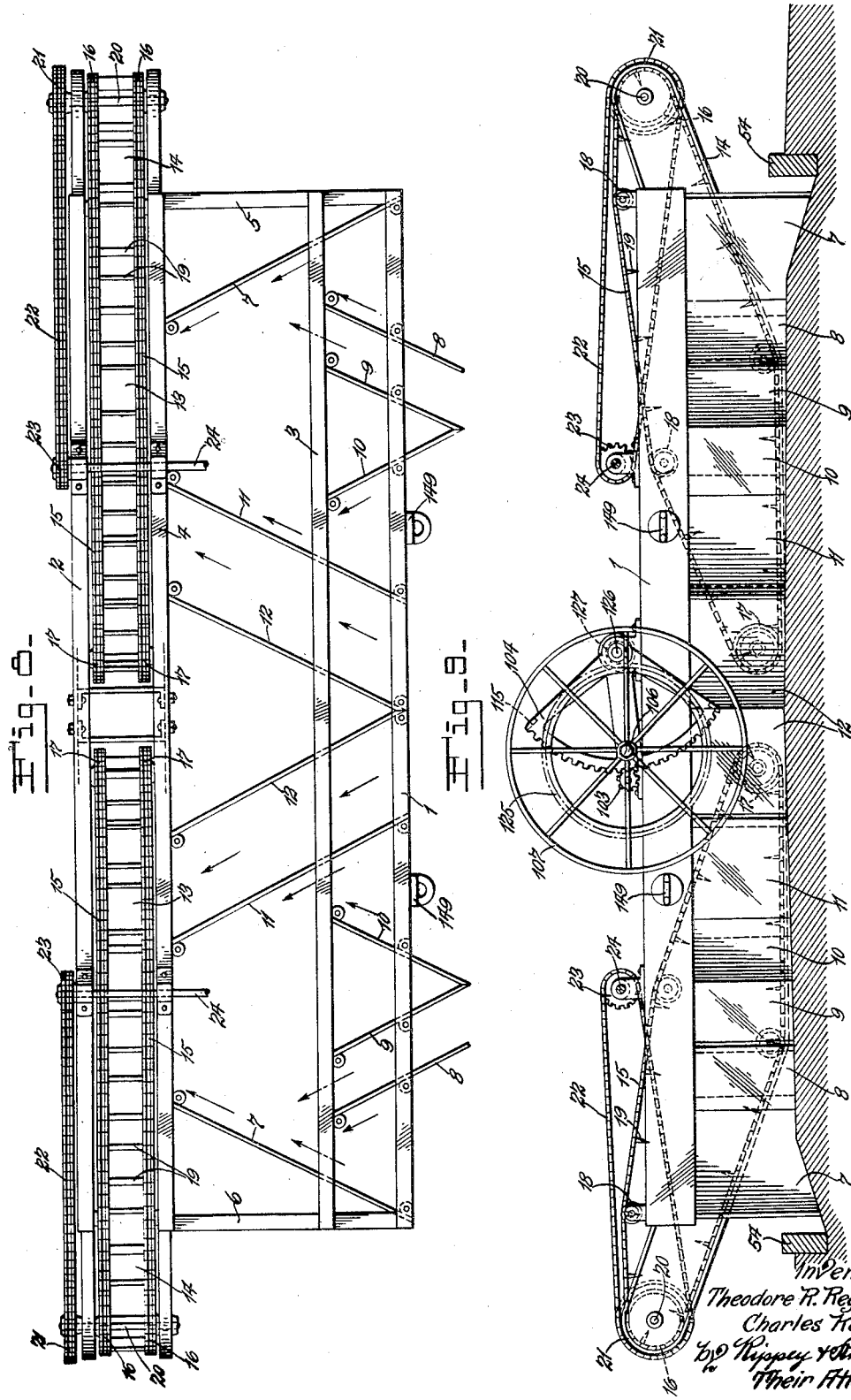

Aug. 1, 1933.  T. R. REGENHARDT ET AL  1,920,319
SUBGRADING MACHINE
Filed May 14, 1931   6 Sheets-Sheet 5
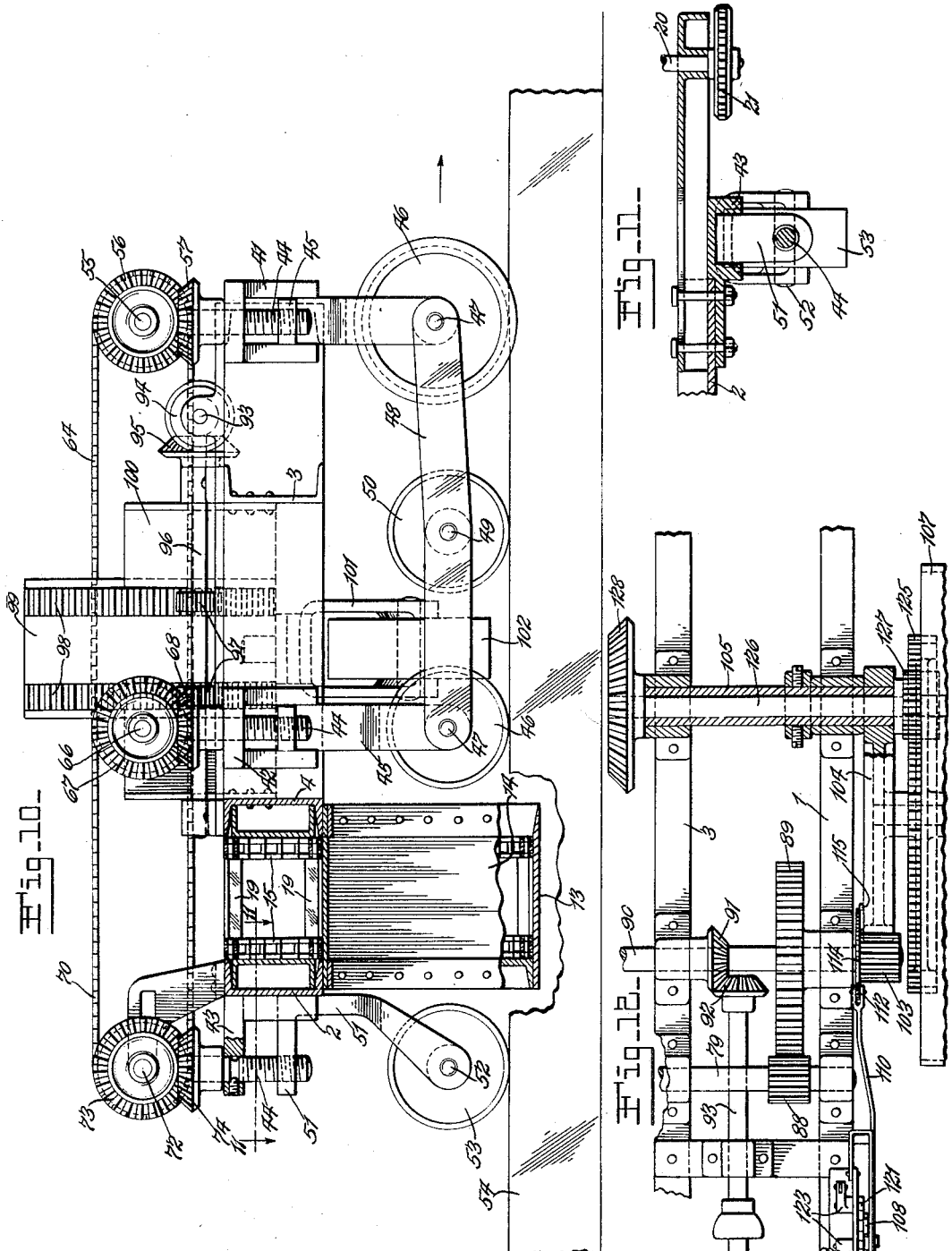
Inventors
Theodore R. Regenhardt
Charles Kassel
by Rippey & Kingsland
Their Attorneys

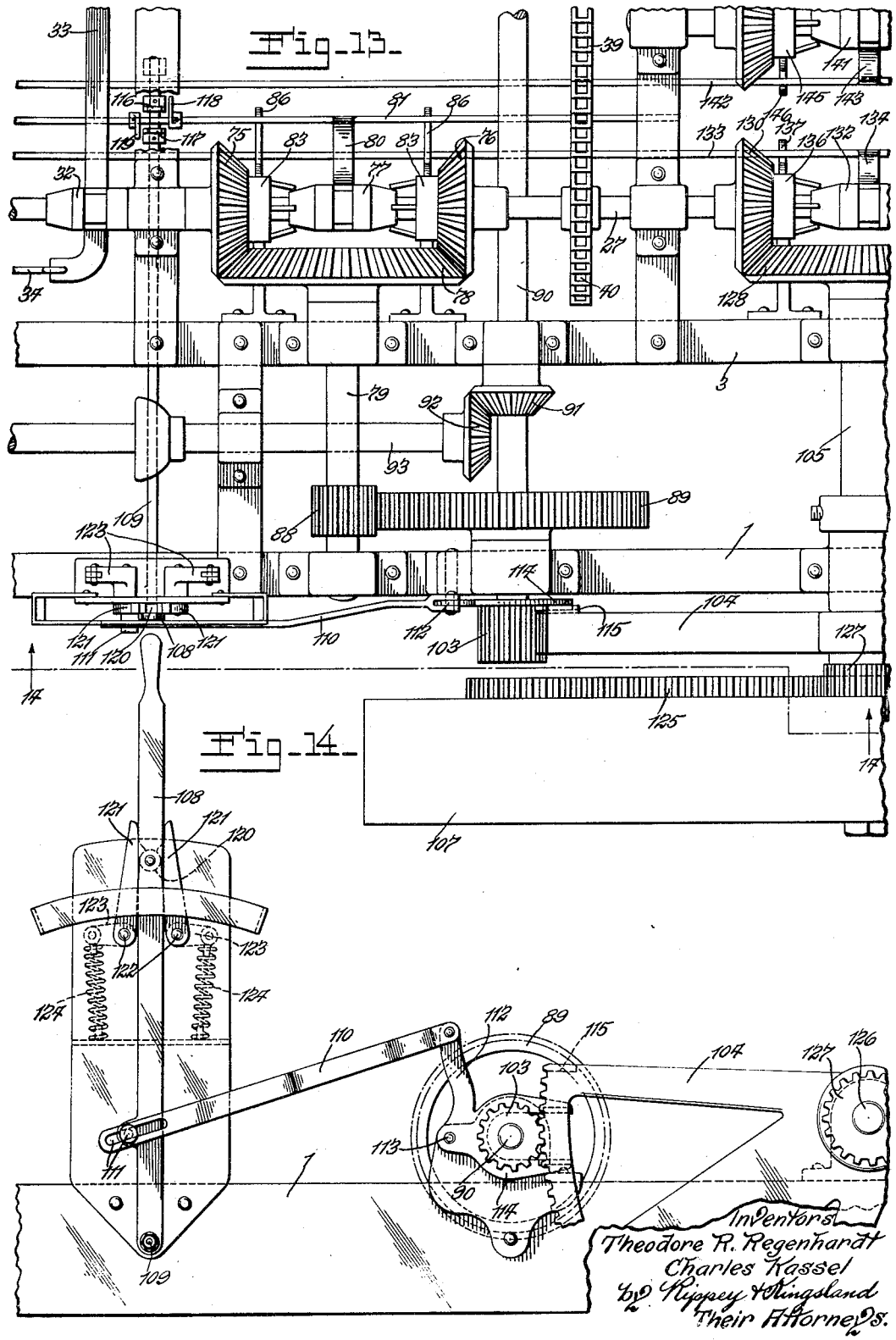

Patented Aug. 1, 1933

1,920,319

UNITED STATES PATENT OFFICE 1,920,319

SUBGRADING MACHINE

Theodore R. Regenhardt and Charles Kassel, Cape Girardeau, Mo., assignors to Regenhardt Construction Company, Cape Girardeau, Mo., a Corporation of Missouri Application May 14, 1931. Serial No. 537,296

14 Claims. (Cl. 37—108.)

This invention relates to subgrading machines.

Objects of the invention are to provide a machine for use in shaping and conditioning roadways properly to receive the pavement; to equip the machine with improved devices for shaping and conditioning the roadway; to provide mechanism for propelling the machine in one direction when the machine is in transit and is not being used to perform its intended functions; to provide traction wheels for supporting the machine when the machine is in transit and is not being used for grading operations; to provide mechanism for adjusting said wheels for use as traction wheels and for moving said wheels out of adjusted position when the machine is to be used for grading purposes; to equip the machine with wheels for supporting the machine when the machine is used for grading operations; to provide equipment and mechanism whereby the same engine or motor may be used to propel the machine in transit when the machine is not being used for grading operations, and also to operate conveyor devices when the machine is operating as a grader; and to provide the machine with all of the additional useful features and equipment herein disclosed, reference being made to the accompanying drawings, in which—

Fig. 1 is a plan view of our improved subgrading machine.

Fig. 2 is an elevation showing that side of the machine which is the front when the machine is operated as a subgrader, the mechanism being adjusted so that the machine may be propelled in transit, as distinguished from service operations.

Fig. 3 is an enlarged view showing trains of gearing embodied in the machine for propelling the machine in transit when the machine is not used as a subgrader and also showing gearing for operating the conveyors.

Fig. 4 is a side elevation of one of the gear assemblies capable of control to propel the machine or to operate the conveyors, as desired.

Fig. 5 is a sectional view on the line 5—5 of Fig. 4.

Fig. 6 is a plan view of the machine frame, the conveyors and engine and much of the gearing shown in Fig. 1 being omitted.

Fig. 7 is a front side elevation of the frame shown in Fig. 6.

Fig. 8 is a plan view of a part of the machine frame including the conveyors and the mold boards.

Fig. 9 is a view similar to Fig. 2 showing the machine in service.

Fig. 10 is a lateral end elevation of the machine adjusted for grading operations.

Fig. 11 is a sectional view on the line 11—11 of Fig. 10.

Fig. 12 is a detail view showing portions of the gearing that propel the machine when the machine is travelling and is not in service as a subgrader.

Fig. 13 is an enlarged view showing portions of the operating gearing and the control devices therefor.

Fig. 14 is a view looking toward the line 14—14 of Fig. 13.

The frame of the machine comprises a front frame member 1, a rear frame member 2, two intermediate frame members 3 and 4, and end frame members 5 and 6 rigidly connecting the respective ends of the longitudinal frame members 1, 2, 3 and 4.

Mold boards 7 have their front ends attached to the frame member 1. These mold boards 7 converge toward the rear and have their rear ends attached to the frame member 4.

Mold boards 8 are attached to the frame members 1 and 3 and diverge toward the rear, their rear ends being spaced inwardly from the mold boards 7.

Mold boards 9 are attached to the frame members 1 and 3 and are spaced inwardly from the mold boards 8 and have their respective forward ends attached to the forward ends of mold boards 10 which converge toward the rear. Thus, the forward ends of the mold boards 8, 9 and 10 extend beyond the front frame member 1 and the rear ends of said mold boards 8, 9 and 10 terminate at a distance in front of the frame member 4, being shown as terminating at the frame member 3.

A pair of mold boards 11 have their front ends attached to the frame member 1 and their rear ends attached to the frame member 4. These mold boards 11 diverge toward the rear and are spaced inwardly from the rear ends of the mold boards 10.

Mold boards 12 have their front ends abutting and attached to the frame member 1. Said mold boards 12 diverge toward the rear and have their rear ends attached to the frame member 4.

The organization and arrangement of these mold boards will be clearly understood by reference to Fig. 8 of the drawings. The arrows indicate the directions in which the earth and other materials are moved by these mold boards. The lower edges of the mold boards may be shaped as desired to meet the requirements of the work on which the machine is being used. It is clear that when the machine is moved forwardly the mold boards will perform their functions as graders and will converge the surplus material along the mold boards 7, 11 and 12 and cause the surplus material to be scooped onto the scoops or scrapers 13. These scoops or scrapers 13 extend laterally at the rear of the machine and have upwardly inclined outer ends 14 along and from which the surplus earth and other materials are moved and discharged by the conveyor devices.

There is one conveyor device for each of the scoops or scrapers 13. Each conveyor device comprises a pair of endless chains 15, each engaging a pair of sprockets 16 and 17 and idlers 18. These sprockets and idlers are arranged so as to maintain the chains 15 close upon the scraper plates 13—14. Each pair of chains is connected by a series of flights or other plates 19 so that, when the conveyor devices are operated, said plates 19 will move the earth and other surplus materials outwardly along the plates 13—14 and discharge said materials beyond the lateral ends of the machine.

Each pair of outer sprocket wheels 16 is attached to a shaft 20 having thereon a sprocket wheel 21 engaged by a chain 22 that is operated by a sprocket wheel 23 attached to a rotary shaft 24. It is clear that, by this construction and arrangement, the conveyor devices will be operated when the shafts 24 are rotated.

Each shaft 24 has a gear 25 attached thereto and meshing with a gear 26 mounted on a shaft 27. One of the gears 26 is provided with a conventional clutch 28 whereby said gear 26 may be driven by the shaft 27 or not, as desired. A shifter lever 29 for the clutch 28 is connected with one end of a link 30, the opposite end of said link being connected with an operating lever 31 supported in any appropriate manner. Thus, it is clear that, by operation of the lever 31, the clutch 28 may be operated in order to drive the gear 26 with the shaft 27 or not, as desired.

The other gear 26 is controlled by a clutch 32 by operation of which the said gear 26 may be driven by the shaft 27 or not, as desired. A shifter lever 33 for said clutch member 32 is connected with one end of a link 34, the opposite end of which is connected with a lever 35. Thus, the levers 31 and 35 may be operated to adjust their respective clutches 28 and 32 in order to drive the two conveyor devices concurrently or independently (Fig. 1).

A motor or engine 36 is mounted on the frame of the machine. The shaft 37 of said motor or engine has thereon a sprocket wheel 38 engaged by a chain 39 that engages a sprocket wheel 40 attached to the shaft 27. Thus the shaft 27 is constantly rotated when the engine or motor 36 is running.

Brackets 41, 42 and 43 are attached to each end of the frame of the machine. A vertical threaded shaft 44 is rotatively supported by each of said brackets. The shafts 44 that are supported by the brackets 41 and 42 at each end of the frame are screwed into the upper ends of brackets 45 that are mounted for vertical sliding movements in the brackets 41 and 42. The lower ends of the brackets 45 are bifurcated and embrace wheels 46. The lower ends of the brackets 45 are connected with the wheel axles 47, and the two axles 47 are connected by connecting bars 48 supporting an axle 49 on which a wheel 50 is mounted. A bracket 51 is mounted for sliding movements in the bracket 43 and has its lower bifurcated end connected to an axle 52 on which a wheel 53 is mounted. The shafts 44 are screwed into the respective brackets 45 and 51 and are operative to raise and lower said brackets 45 and 51. When the shafts 44 are turned in one direction, they will raise the wheels 46, 50 and 53 to idle positions, as shown in Fig. 2; and when said shafts 44 are rotated in the opposite direction, they will lower said wheels 46, 50 and 53 to the positions shown in Fig. 7, so that said wheels may roll along the tracks or rails 54.

A shaft 55 (Figs. 2 and 7) is rotatively supported by the frame and has on its ends gears 56 meshing with gears 57 attached to the upper ends of the shafts 44 that are mounted in the brackets 41. The shaft 55 may be rotated in either direction by rotation of a shaft 58 mounted in a bracket 59 and having thereon a worm gear 60 meshing with a gear 61 attached to the shaft 55. A handle wheel 62 is attached to the upper end of the shaft 58 and constitutes manual means for rotating said shaft 58.

A sprocket wheel 63 is attached to each end portion of the shaft 55. The sprocket wheels 63 are engaged by sprocket chains 64 that also engage sprocket wheels 65 on shafts 66 rotatively supported by the machine. Gears 67 attached to the shafts 66 mesh with gears 68 on the upper ends of the shafts 44 that are mounted in the brackets 42. The shafts 66 have thereon sprocket wheels 69 engaged by chains 70 that also engage sprocket wheels 71 attached to shafts 72 rotatively supported by the frame of the machine. The shafts 72 have attached thereto gears 73 which mesh with gears 74 attached to the upper ends of the shafts 44 that are mounted in the brackets 43.

It is now clear that rotation of the shaft 58 will cause the shaft 55 through the trains of gearing described to rotate all of the shafts 44 and thereby raise or lower the wheels 46, 50 and 53 at both ends of the machine, depending upon the direction of rotation of said shaft 58.

The shaft 27 has loosely mounted thereon a pair of gears 75 and 76 controlled by a conventional clutch 77 mounted on said shaft 27 between said gears and shiftable from idle or ineffective position to position to clutch either of said gears 75 or 76 to said shaft 27. Thus, either of said gears 75 or 76 may be rotated by the shaft 27, or both of said gears 75 and 76 may be idle while the shaft 27 is rotating. Both gears 75 and 76 are in constant mesh with a gear 78 attached to a shaft 79 rotatively supported by the machine. Thus, the shaft 79 may be rotated in either direction, as desired, by driving said shaft from that gear 75 or 76 by which the desired direction of rotation may be obtained. An arm 80 attached to a clutch shifter rod 81 engages the clutch 77 so that longitudinal movement of said shifter rod 81 will shift the clutch 77 to ineffective position, in which both gears 75 and 76 may remain idle, or to position to clutch either of said gears to the shaft 27, while the other gear remains idle. A lever 82 is operatively connected with the clutch shifter rod 81 for operating said rod.

The hub of each wheel 75 and 76 is encircled by a resilient brake band 83 (Figs. 4 and 5). One end of each brake band is attached to a rigid support 84 and the other end of each brake band is connected to one end of a link 85 which has its opposite end connected to one arm of a bell crank lever 86. The two bell crank levers 86 are pivoted to the stationary supports 84. Each bell crank lever 86 has an arm extending under a cam 87. The two cams 87 are rigid on the shifter rod 81. These cams 87 engage the bell crank levers 86 and hold both of the brakes 83 clamped on the hubs of the gears 75 and 76 only during the time that the clutch 77 is disengaged from both gears 75 and 76. This is clear from Fig. 4 of the drawings. Longitudinal movement of the shifter rod 81 in either direction so as to shift the clutch member 77 into clutching engagement with either of the gears 75 or 76 will move the cams 87 out of effective engagement with the levers 86 and thus release both gears 75 and 76 from restraint by the brakes 83.

The shaft 79 has attached thereto a gear 88 that is in constant mesh with a gear 89 attached to a shaft 90 rotatively supported by the machine. The shaft 90 has attached thereto a gear 91 meshing with a gear 92 attached to a shaft 93 rotatively supported by the machine. The shaft 93 has attached thereto a pair of gears 94 that mesh respectively with gears 95 attached to shafts 96 rotatively supported by the machine. Two gears 97 are attached to each shaft 96 and mesh with vertical racks 98 rigid with a vertically movable slide 99. The vertically movable slide 99 is mounted between and engages guides 100 attached to the frame members 3 and 4. Thus, the shafts 96 may be rotated in either direction, depending upon whether the shaft 79 is driven by the gear 75 or by the gear 76. Rotation of the shafts 96 in one direction will raise the slide 99, and rotation of said shafts 96 in the opposite direction will move the slide 99 downwardly.

A bracket 101 (Fig. 10) is swiveled to the lower end of the slide 99. The bracket 101 is bifurcated and embraces a traction wheel 102. The traction wheel is rotatively supported by the bracket 101 and, by the operations described, may be raised to a position in which it will not operate along the ground or pavement, or may be lowered to a position in which it will operate along the ground or pavement.

The shaft 90 has attached thereto a pair of gears 103 (Fig. 3) that are in permanent mesh with segmental racks 104. The segmental racks 104 are mounted on the outer ends of tubular shafts 105 (Figs. 3 and 12). Each segmental rack 104 supports an axle member 106. A traction wheel 107 is rotatively mounted on each axle member 106. One of the traction wheels 107 is at the front and the other is at the rear of the frame of the machine.

By reference to Figs. 2 and 9 of the drawings, it is clear that the segmental racks 104 may be moved upwardly to position to support the traction wheels 107 above the surface of the ground or pavement and out of the way so as to permit operation of the machine for grading purposes; and downward movement of the racks 104 will move the traction wheels 107 downwardly to the positions shown in Fig. 2, so that said wheels 107 will operate along the surface of the road or pavement. A lever 108 (Figs. 13 and 14) has its lower end attached to a rock shaft 109. A link 110 has one end connected by pin-and-slot connection 111 with the lever 108 and has its opposite end pivoted to a lever arm 112. The lever arm 112 is mounted on a pivot 113. A bifurcated extension 114 from the lever arm 112 embraces the shaft 90 between its arms and projects between two lateral extensions 115 from the adjacent segmental rack 104. The inner end of the rock shaft 109 has attached thereto a pair of arms 116 and 117 adjacent to arms 118 and 119, respectively, that are attached to and project from the clutch shifter link 81. One of the projections 115 is at the upper end of the rack 104 and another of said projections is at the lower end of said rack.

It is now clear that, when the clutch 77 is in its idle position and is out of engagement with both gears 75 and 76, the shaft 79 will not be rotated. When the clutch member 77 is in engagement with the gear 75 or with the gear 76, the shaft 79 will be rotated thereby. When the shifter rod 81 is moved longitudinally to shift the clutch member 77 into engagement with the gear 75, said shifter rod 81 locates the arm 118 close to the arm 116; and when the shifter rod 81 is moved longitudinally in the opposite direction to engage the clutch member 77 with the gear wheel 76, said shifter rod 81 locates the arm 119 close to the arm 117. In either of the shifted positions of the rod 81, a rocking movement of the shaft 109 will cause the arm 116 or the arm 117, as the case may be, to strike against the arm 118 or the arm 119 and thereby move the shifter arm 81 to its intermediate or idle position, in which the clutch member 77 is disengaged from both gear wheels 75 and 76.

This shifting of the shifter rod 81 to its idle or starting position to disengage the clutch member 77 from either gear wheel 75 or 76 is automatically effected by the projections 115 on the segmental rack 104 striking against the arms 114 (Figs. 13 and 14), and thereby operating the lever 112—114 and causing the link 110 to operate the lever 108. Because said lever 108 is attached to the shaft 109, this automatic operation of said lever 108 will rock said shaft 109 and cause the arms 116 and 117 to strike against and operate the arms 118 and 119, respectively, and thereby move the shifter rod 81 in a direction and to an extent to disengage the clutch member 77 from the gear wheels 75 and 76, respectively. Thus, at the proper time and automatically and as an incident to the operation of the machine to raise or to lower the traction wheels 107 and 102, the gearing for operating the racks 104 is disabled and operation of said gearing is stopped.

The lever 108 supports a roller 120. Latch detents 121 are attached to pivots 122 which have attached thereto arms 123 (Figs. 13 and 14). Springs 124 engage the arms 123 effectively to press the latch detents 121 against the roller 120. Thus the lever 108 will be yieldingly latched in either of its operated positions to which it is moved as required to adjust the arms 116 and 117 so that said arms will move the shifter rod 81 as above described.

Each of the traction wheels 107 is rigid with a gear 125 (Figs. 1 and 3). A pair of axially alined shafts 126 are rotative in the tubular shafts 105 and have on their outer ends gears 127 in permanent mesh with the gears 125, respectively. The shafts 126 are rotative in and independently of the tubular shafts 105. The inner end of one of the shafts 126 has attached thereto a gear 128, and a similar gear 129 is attached to the inner end of the other shaft 126.

The gear 128 is in permanent mesh with two gears 130 and 131 loosely mounted on the shaft 27. A clutch member 132 on the shaft 27 is shiftable from idle or neutral position, in which it is out of engagement with both gears 130 and 131, to position to engage either of said gears and thereby rotate the gear 128 by either gear 130 or 131, at the option of the operator. Thus, the traction wheel 107 may be rotated in either direction as desired. A shifter link 133 has a connection 134 with the clutch member 132. This shifter link is longitudinally movable and is operative independently of the shifter rod 81 by a lever 135. Brake bands 136 are mounted on the hubs of the gears 130 and 131 and are arranged just like the brake band 83, the construction and arrangement of which have been described and are clearly shown in Figs. 4 and 5 of the drawings. The brake band operating levers 137 are arranged just like the operating levers 86 and are operated by cam devices on the link 133 just like the cam devices 87. Accordingly, when the link 133 is in the position it occupies when the clutch member 132 is in its idle or neutral position, said link 133 holds the brake levers 134 in position to perform a braking effect upon the wheels 130 and 131 and thereby prevent said wheels from rotating idly with the shaft 27.

The gear 129 is in permanent mesh with two gears 138 and 139 loosely mounted on a shaft 140. A clutch member 141 on the shaft 140 is shiftable from idle or neutral position, in which it is out of engagement with both gears 138 and 139, to position to engage either of said gears and thereby rotate the gear 129 by either gear 138 or 139, at the option of the operator. Thus, the traction wheel 107 that is driven by the wheel 129 may be rotated in either direction, as desired. A shifter link 142 has a connection 143 with the clutch member 141. This shifter link is longitudinally movable and is operative independently of the shifter rods 81 and 133 by a lever 144. Brake bands 145 are mounted on the hubs of the gears 138 and 139 and are arranged just like the brake bands 136 and also like the brake band 83, which said brake band 83 is clearly shown in Figs. 4 and 5 of the drawings. The brake band operating levers 146 are arranged just like the operating levers 86 and are operated by cam devices on the link 142 just like the cam devices 87. Accordingly, when the link 142 is in the position it occupies when the clutch member 141 is in its idle or neutral position, said link 142 holds the brake levers 146 in position to perform a braking effect upon the wheels 138 and 139 and thereby prevent said wheels from rotating idly with the shaft 140.

A gear 147 attached to the shaft 27 is in permanent mesh with a gear 148 attached to the shaft 140, so that said shaft 140 is constantly rotated with and by the shaft 27.

When it is desired to move the machine from place to place along a roadway or highway, or elsewhere, without performing grading operations, the shaft 58 is rotated to raise the wheels 46, 50 and 53 at both ends of the machine to their upper and out-of-the-way positions. The friction of the gearing and operating mechanism whereby said wheels 46, 50 and 53 are raised is sufficient to prevent said wheels from moving downwardly of their own accord.

The engine or motor 36 being in operation, the shaft 27 is rotated thereby. The lever 108 is then operated toward the left as seen in Fig. 14, thereby raising the lever arms 114 to a position in which the upper arm 114 will be engaged and operated by the projection 115 when the segmental rack 104 is moved downwardly.

Next the shifter connections 82—81 are operated to shift the clutch member 77 into engagement with the gear wheel 75 for instance, thereby rotating the shaft 79. The shaft 79 rotates the gear 88 and thereby the gear 89 and the shaft 90. The gears 103 on the shaft 90 being in engagement with the segmental racks 104, move both of said racks downwardly. Because the wheels 107 are mounted on and carried by the segmental racks 104, it is clear that said wheels 107 will be moved downwardly from the raised position shown in Fig. 9 to the lowered position shown in Fig. 2 of the drawings. This raises the machine and supports the intermediate portion of the machine by the wheels 107. Because of the connections 91, 92, 93, 94, 95, 96 and 97, the slide 99 is simultaneously moved downwardly with the downward movement of the wheels 107, causing the traction wheel 102 to raise that end of the machine on which the engine 36 is mounted. These operations of raising the machine by lowering the wheels 107 and 102 may be performed before the wheels 46, 50 and 53 are raised or afterwards, as desired.

The downward movement of the racks 104 causes the projection 115 on one of said racks to engage the upwardly extended arm 114 and thereby operate the lever 112 and link 110 and positively release the lever 108 from its latching engagement with the latch pawl 121. Such latching engagement was effected by engagement of a latch pawl 121 with the roller 120. This operation of the lever 108 rocked the shaft 109 effectively to cause the arm 46 on said shaft 109 to engage the arm 113 on the rod 81 and quickly shift said rod in a direction and to an extent to move the clutch member 77 out of engagement with the wheel 75. Simultaneously, the cams 87 on rod 81 engaged the brake operating levers 86, causing said levers to set the brakes 83 and hold both wheels 75 and 76 from rotation with the shaft 27.

Then both wheels 107 may be rotated in the same direction to propel the machine in either direction by shifting the clutch members 132 and 141 to engage the respective gears with which they are arranged to cooperate. Thus, by shifting the clutch member 132 into engagement with the gear 130 and the clutch member 141 into engagement with the gear 138, the machine will be propelled in one direction. And, by shifting the clutch member 132 into engagement with the wheel 131 and the clutch member 141 into engagement with the clutch member 139, the machine will be propelled in the opposite direction.

The traction wheels 102 and 107 support the machine at a height in which the mold boards do not interfere with the travel of the machine. The conveyor devices need not be operated when the machine is travelling from place to place and may be held idle if desired, because the clutch member 28 controls the gear wheel 26 at one end of the shaft 27 and the clutch member 32 controls the gear wheel 26 at the opposite end of the shaft 27. These clutch members 28 and 32 are operated by the connections 29 and 33, etc., as described.

It is also possible to drive either wheel 107 while the other remains unoperated, so as to cause the machine to rotate about either wheel 107 as a pivot. Thus, the machine may be easily turned on a very small space, because the clutch members 132 and 141 are independently operative. Either of said clutch members may be retained in an unoperated position when the other is operated. It is even possible to engage the clutch member 132 with either of the wheels 130 or 138 while the clutch member 141 is engaged with the opposite end of the wheels 138 or 139 so as to rotate the wheels 107 simultaneously but in opposite directions.

When it is desired to use the machine as a grader, the clutch members 132 and 131 are shifted to their neutral or idle positions so the machine is no longer propelled by the running engine. Then the mechanism controlled by the shaft 58 is operated to lower the wheels 46, 50 and 53 at both ends of the machine onto the rails or guides 54. Next the lever 108 is shifted toward the right as seen in Fig. 14, thereby extending downwardly to an inclined position the arms 114. Then the clutch 77 is shifted to engagement with that gear 75 or 76 which is operative to drive the train of gearing 78, 79, 88, etc. in a direction to move the racks 104 upwardly and thereby raise the traction wheels 107 and also the traction wheel 102 upwardly to idle positions indicated in Figs. 9 and 10 of the drawings.

Upward movement of the rack 104 that is adjacent to the lever 114 causes the projection 115 to operate the lever 114 and thereby, through the connections shown and described, operate the lever 108 to cause the rock shaft 109 quickly to shift the shifter rod 81 to its neutral position. When the shifter rod 81 is shifted to its neutral position in this way, it moves with it the clutch member 77. The clutch member 77 is thereby moved to its neutral or idle position, in which it is out of engagement with both gears 75 and 76. Thus, further operation of the train of gearing 75, 76, 78, 88, etc. is stopped.

Then the clutches 28 and 32 are shifted into engagement with their respective gears 26 so as to operate the conveyor mechanism of the machine.

The machine may be drawn forwardly by any mechanism provided for that purpose. The front of the machine is equipped with brackets 149 with which drag bars or chains or other coupling elements may be connected in order to draw the machine along the roadway that is being graded.

It is now clear that our invention obtains all of its intended objects and purposes in a highly efficient and satisfactory way. The construction and arrangement of the various bearings and other mechanisms included in the machine may be widely varied without departure from the nature and principle of the invention. We do not restrict ourselves in any unessential respects, but contemplate such variations as may be within the scope of the appended claims.

We claim:—

1. A subgrader comprising a frame, a laterally extended scoop near the rear of the frame for receiving materials, a plurality of rearwardly converging mold board elements rigid with said frame and arranged to discharge material at the front of said scoop, wheels at the sides of said frame for supporting said frame during operation, an upwardly and laterally extended portion at the outer ends of said scoop extending upwardly and laterally beyond some of said wheels, conveyor mechanism operating above said scoop and above said upwardly and laterally extended portion, and driving mechanism supported by said frame for operating said conveyor mechanism.

2. A subgrader comprising a frame, wheels at the sides thereof for supporting said frame, a horizontal scraper at the rear of said frame having a portion extended upwardly and laterally beyond some of said wheels, conveyor mechanism for moving materials laterally along said scraper and said upwardly and laterally extended portion, power mechanism supported by said frame for operating said conveyor mechanism, and spaced rearwardly diverging mold boards for discharging materials onto said scraper.

3. A subgrader comprising a frame, rearwardly converging mold boards attached to the end portions of said frame, rearwardly diverging mold boards attached to the front of said frame between said first mold boards, mold boards attached to the frame spaced inwardly from and parallel with said second mold boards, rearwardly converging mold boards having their ends attached to the front ends of said third mold boards, a pair of spaced mold boards diverging toward the rear and spaced inwardly from said last preceding mentioned mold boards, and a pair of rearwardly diverging mold boards attached to said frame between the aforesaid pair of mold boards.

4. A subgrader comprising a frame, rearwardly converging mold boards attached to the end portions of said frame, rearwardly diverging mold boards attached to the front of said frame between said first mold boards, mold boards attached to the frame spaced inwardly from and parallel with said second mold boards, rearwardly converging mold boards having their ends attached to the front ends of said third mold boards, a pair of spaced mold boards diverging toward the rear and spaced inwardly from said last preceding mentioned mold boards, a pair of rearwardly diverging mold boards attached to said frame between the aforesaid pair of mold boards, and mechanism for receiving and conveying laterally the material worked by said mold boards.

5. A subgrader comprising a frame, wheels at the sides of and supporting said frame, a pair of laterally extended scoops near the rear of the frame for receiving materials and each having an outer portion extending upwardly and outwardly beyond said wheels, a series of mold boards for working materials to be received on each of said scoops and having their rear ends forming restricted discharge spaces at the front of said scoops respectively, and mechanism supported by said frame for moving the materials laterally along said scoops and discharging the materials from the ends of said scoops.

6. A subgrader comprising a frame, wheels at the sides of and supporting said frame, a pair of laterally extended scoops near the rear of the frame for receiving materials and each having an outer portion extending upwardly and outwardly beyond said wheels, a series of mold boards for working materials to be received on each of said scoops and having their rear ends forming restricted discharge spaces at the front of said scoops respectively, mechanism supported by said frame for moving the materials laterally along said scoops and discharging the materials from the ends of said scoops, and mechanism for adjusting and holding said wheels in position to support said frame at different heights.

7. A subgrader comprising a frame, a pair of scoops supported by said frame, two pairs of mold boards for loosening earth to be received on said scoops respectively and the mold boards of each pair converging rearwardly, a number of rearwardly diverging mold boards between the forward ends of the mold boards of each pair, conveyor mechanisms for moving the materials along and discharging the materials from said scoops respectively, a motor supported by said frame, a shaft, gearing for rotating said shaft by said motor, gearing operative by said shaft for operating said conveyor mechanism, and gearing operative by said shaft for raising and lowering said frame to place said mold boards in or out of position for operation.

8. A subgrader comprising a frame, a series of mold boards supported by said frame for loosening a continuous strip of earth and materials equal in width to the distance from one end to the other end of said series of mold boards, conveyor mechanism supported by said frame for discharging laterally the earth and materials loosened by said mold boards, a motor supported by said frame, mechanism operated by said motor for adjusting said frame and said mold boards in position for operation, and mechanism operated by said motor for operating said conveyor mechanism.

9. A subgrader comprising a frame, a series of mold boards supported by said frame for loosening a continuous strip of earth and materials equal in width to the distance from one end to the other end of said series of mold boards, conveyor mechanism for conveying the loosened earth and materials laterally beyond the sides of said frame, wheels for supporting said frame during operation, a motor supported by said frame, mechanism operative by said motor for raising and lowering said frame to position to be supported by said wheels, and mechanism operated by said motor for operating said conveyor mechanism.

10. A subgrader comprising a frame, a series of mold boards supported by said frame for loosening a continuous strip of earth and materials equal in width to the distance from one end to the other end of said series of mold boards, conveyor mechanism for conveying the loosened earth and materials laterally beyond the sides of said frame, wheels for supporting said frame during operation, a motor supported by said frame, mechanism operative by said motor for raising and lowering said frame to position to be supported by said wheels, mechanism operated by said motor for operating said conveyor mechanism, and devices supported by said frame controlling the raising and lowering of said frame by said motor.

11. A subgrader comprising a frame, conveyor mechanism for conveying and discharging materials laterally beyond the sides of said frame, a series of mold board devices for loosening and discharging onto said conveyor mechanism a continuous strip of the materials to be conveyed and discharged equal in width to the distance from end to end of said series of mold board devices, a motor supported by said frame, mechanism operated by said motor for positioning said frame vertically for operation, and mechanism operative by said motor for operating said conveyor mechanism.

12. A subgrader comprising a frame, conveyor mechanism for conveying and discharging materials laterally beyond the sides of said frame, a series of mold board devices for loosening and discharging onto said conveyor mechanism a continuous strip of the materials to be conveyed and discharged equal in width to the distance from end to end of said series of mold board devices, a motor supported by said frame, mechanism operated by said motor for positioning said frame vertically for operation, mechanism operative by said motor for operating said conveyor mechanism, and control mechanisms supported by said frame controlling operation of said conveyor mechanism by said motor and controlling vertical positioning of said frame by said motor respectively.

13. A subgrader comprising a frame, conveyor mechanism for conveying and discharging materials laterally beyond the sides of said frame, a series of mold board devices for loosening and discharging onto said conveyor mechanism a continuous strip of the materials to be conveyed and discharged equal in width to the distance from end to end of said series of mold board devices, a motor supported by said frame, mechanism operated by said motor for positioning said frame vertically for operation, mechanism operative by said motor for operating said conveyor mechanism, control mechanisms supported by said frame controlling operation of said conveyor mechanism by said motor and controlling vertical positioning of said frame by said motor respectively, and manually operative means supported by said frame for effecting vertical adjustment of said frame irrespective of the operation of said motor.

14. A subgrader comprising a frame, two spaced rearwardly converging mold boards which are attached to the respective end portions of said frame and which define the width of the material worked by the subgrader, a series of mold boards attached to said frame between said two mold boards and each of which is in converging relationship with respect to one of said two mold boards and each of which is arranged to work a part of the material in said strip that is worked by another during forward travel of the subgrader, a pair of laterally extended scoops supported by said frame rearwardly from said mold boards for receiving materials worked by said mold boards, and mechanism supported by said frame for moving said materials laterally along said scoops and discharging said materials from the ends of said scoops.

THEODORE R. REGENHARDT.
CHARLES KASSEL.